(No Model.)
M. HEFFERNAN.
BELT FASTENER.
No. 308,257.  Patented Nov. 18, 1884.
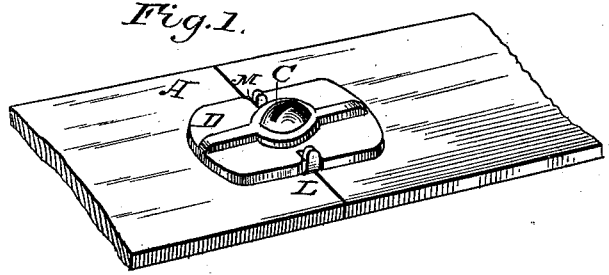
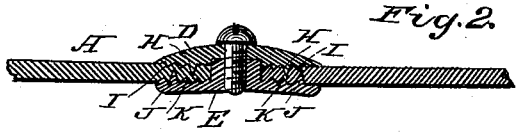
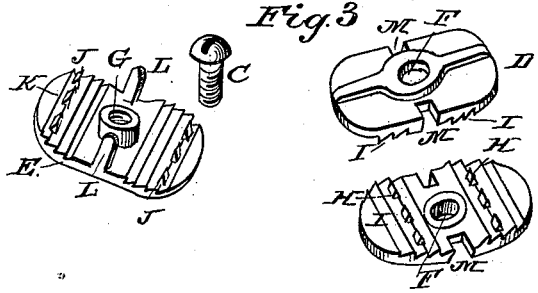
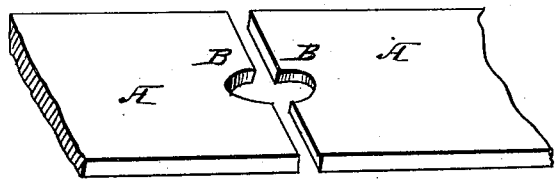
WITNESSES:
Mathew Heffernan
INVENTOR.
By Louis Bagger & Co.,
ATTORNEYS.

UNITED STATES PATENT OFFICE.

MATTHEW HEFFERNAN, OF NEWBURG, OHIO.

BELT-FASTENER.

SPECIFICATION forming part of Letters Patent No. 308,257, dated November 18, 1884.

Application filed August 18, 1884. (No model.)

*To all whom it may concern:*

Be it known that I, MATTHEW HEFFERNAN, of Newburg, in the county of Cuyahoga and State of Ohio, have invented certain new and useful Improvements in Belt-Fasteners; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of the ends of a machine-belt secured together by my improved belt-fastener. Fig. 2 is a longitudinal section of the same; and Fig. 3 is a perspective view of the several parts of the fastener detached, showing the outer plate of the fastener seen from both sides.

Similar letters of reference indicate corresponding parts in all the figures.

My invention has relation to that class of belt-fasteners in which the ends of the belt are secured together by means of two plates provided with teeth engaging the belt, and having means for securing the plates together, clamping the ends of the belt; and it consists in the improved construction and combination of parts of the same, as hereinafter more fully described and claimed.

In the accompanying drawings, the letter A indicates the belt, the ends of which have semicircular notches B B cut into them for the accommodation of the screw C, which secures the two clamping-plates D and E together, passing through a smooth perforation, F, in the middle of the outer plate, D, and through a threaded perforation, G, in the inner plate, E.

The outer plate is provided upon its inner side with two transverse rows of teeth, H, adapted to enter the surface of the belt, one row of teeth being near each end of the plate, and the entire inner face of the plate is provided with a number of transverse corrugations, I, and the inner plate has likewise a transverse row of teeth, J, near each end of its inner side, which side likewise has transverse corrugations K.

The inner plate is provided with two upwardly-projecting lugs or pins, L L, at the middles of its side edges, which lugs correspond to two notches, M M, in the middle of the side edges of the outer plate, and these lugs and notches serve to guide the plates to register with each other and to prevent their turning.

It will be seen that when the fastener is to be used two notches are made in the ends of the belt, whereupon the ends are brought together, the plates placed in position and connected by means of the screw, which by being turned will force the two plates together, forcing their teeth into the ends of the belt and causing the corrugations upon the inner faces of the plates to bite in the faces of the belt, clamping the ends firmly and thus uniting them.

I am aware that it is not new to have belt-fasteners consisting of two plates having corrugations and prongs upon their facing sides and secured together by screws adapted to clamp the ends of belts, and I do not claim such construction broadly; but

I claim—

In a belt-fastener consisting of two plates having corrugations and prongs upon their meeting faces, and connected by a screw, the combination of the lower plate, provided at the middle of its side edges with upwardly-projecting lugs, with the upper plate having notches at the middles of its side edges corresponding to the said lugs and receiving them, as and for the purpose shown and set forth.

In testimony that I claim the foregoing as my own I have hereunto affixed my signature in presence of two witnesses.

MATTHEW HEFFERNAN.

Witnesses:
EDWARD C. DAY,
JOSEPH HORTON.